United States Patent [19]

Vassar

[11] Patent Number: 5,592,741

[45] Date of Patent: Jan. 14, 1997

[54] TUBE CUTTER

[76] Inventor: John J. Vassar, 1210 Rushmore Dr., Colorado Springs, Colo. 80910-2023

[21] Appl. No.: 506,801

[22] Filed: Jul. 25, 1995

[51] Int. Cl.⁶ .................................................. B23D 21/08
[52] U.S. Cl. ............................. 30/101; 30/102; 83/178
[58] Field of Search ............................ 30/101, 102, 92, 30/93, 94, 95, 108, 96, 97; 82/113, 101, 83; 83/185, 195, 178, 54

[56] References Cited

U.S. PATENT DOCUMENTS

| | | | |
|---|---|---|---|
| 483,778 | 10/1892 | Chesterton | 30/108 |
| 1,170,588 | 2/1916 | Wells | 30/102 |
| 1,691,530 | 11/1928 | Slayton | 30/102 |
| 2,683,930 | 7/1954 | Walters | 30/101 X |
| 2,821,781 | 2/1958 | Zeiler | 30/102 |
| 2,869,413 | 1/1959 | Anderson | 30/94 X |
| 2,875,517 | 3/1959 | Bauman | 30/101 |
| 3,135,050 | 6/1964 | Franck | 30/102 X |
| 3,315,355 | 3/1967 | Osburn et al. | 30/92 X |
| 3,624,684 | 11/1971 | Kowal | 30/102 |
| 4,227,431 | 10/1980 | Wells | 30/101 X |
| 4,294,011 | 10/1981 | Kemme | 30/106 |
| 4,531,288 | 7/1985 | Aubriot | 30/101 X |
| 4,608,755 | 9/1986 | Braasch | 82/113 X |
| 4,890,385 | 1/1990 | VanderPol et al. | 30/101 |
| 5,022,155 | 6/1991 | Hockett | 30/93 |
| 5,099,577 | 3/1992 | Hutt | 30/101 |

*Primary Examiner*—Rinaldi I. Rada
*Assistant Examiner*—Elizabeth Stanley
*Attorney, Agent, or Firm*—Palmatier, Sjoquist, Helget & Voigt, P.A.

[57] ABSTRACT

A cutting tool for severing the end of a copper tube or the like, the tool having a cylindrical post for insertion into the tube end, and a pivotal beam having a cutter wheel mounted at one end. A rotatable knob is mechanically linked to the pivotal beam to cause it to pivot toward and away from the cylindrical post. The entire tool may be rotated about the axis of the tube while the cutter wheel is in contact with the tube to cut a circumferential groove into the tube and thereby to sever the tube.

10 Claims, 2 Drawing Sheets

5,592,741

TUBE CUTTER

BACKGROUND OF THE INVENTION

This invention relates to a device for cutting tubes. More particularly, the invention relates to a hand-held tool for cutting a smooth end on a copper tubing material or the like. The invention finds particular utility in trimming the end of copper tubing, as for example, by removing a previous flare, in work site locations which have tight space constraints.

Copper tubing is widely used in industry for conveying liquids and gases of all types and is convenient for use in construction and other environments because it is easily bendable and may be formed to fit into whatever space may be available. Furthermore, a tight, sealed connection is readily made between two sections of copper tubing, or copper and a brass fitting, either by conventional solder fittings or by mechanical sealing arrangements. Copper tubing can be easily attached to valves and other forms of couplers by forming a flare at the end of a section of copper tubing and clamping the flared end against a complementary-shaped fitting via a flare nut. Flares can be readily formed by flaring tools, and copper tubing can be easily cut to size or trimmed by conventional tube cutters.

One disadvantage with conventional tube cutters is that they do require considerable room for operating. For example, a conventional tube cutter comprises a clamping device which may be threadably adjusted by means of a projecting handle so that it can be fitted over the tubing and gradually tightened against the tubing while turning the cutter about the tubing. A blade in the clamping device bears against the tubing and gradually cuts through the tubing as the tool is rotated about the tubing axis. The cut is inherently made at some distance from the flare.

The present invention provides a tube cutter of this general type but which requires very little space for operation. The invention is compact in form and size and is conveniently usable in nearly all workplace locations.

SUMMARY OF THE INVENTION

A tube cutter comprising a sharpened cutting wheel rotatably mounted to a pivotable beam, the beam being pivotally mounted within a housing. A threadable adjusting member is connected to the beam to cause the pivotal motion. A short cylindrical post extends from the housing adjacent the cutting wheel path of movement, the post being sized for insertion into the end of a tube which is to be trimmed. The post may be selectable as to size.

It is a principal object of the present invention to provide a tube cutter capable of operating in a very restricted space.

It is another principal object of the invention to provide a tube cutter which will cut a flare off the end of a copper tube as close as possible to the base of the flare.

It is another object of the present invention to provide a tube cutter which is of compact form and design.

It is a feature and advantage of the present invention to provide an adjustable cutting wheel mounted in a housing and which occupies less than about one cubic inch of space.

BRIEF DESCRIPTION OF THE DRAWINGS

The foregoing and other objects and advantages of the present invention will become apparent from the following specification and claims and with reference to the drawings.

DESCRIPTION OF THE PREFERRED EMBODIMENT

Figure 1:
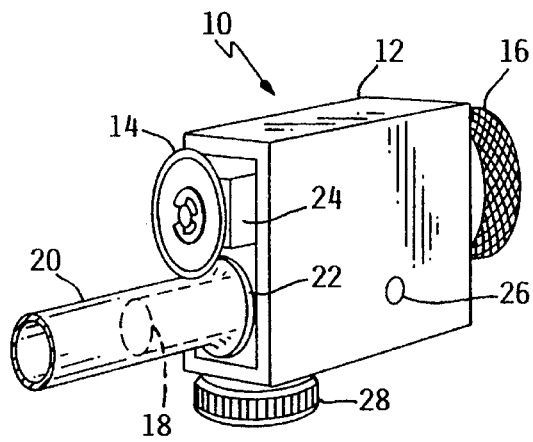
FIG. 1 shows a perspective view of the invention in an operating mode.

Referring first to FIG. 1, the tube cutter of the present invention is shown generally at 10. Tube cutter 10 is illustrated in an operable condition, wherein an end section of tubing 20 is inserted over a cylindrical post 18, which projects outwardly from housing 12 of tube cutter 10. Tubing 20 has a flare 22. A cutting wheel 14 is mounted to the end of a beam 24 which is pivotable within housing 12.

Figure 2:
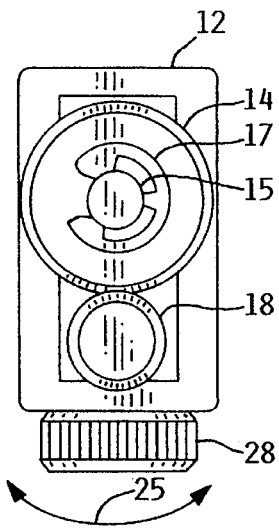
FIG. 2 shows a front side view of the invention.
Figure 3:
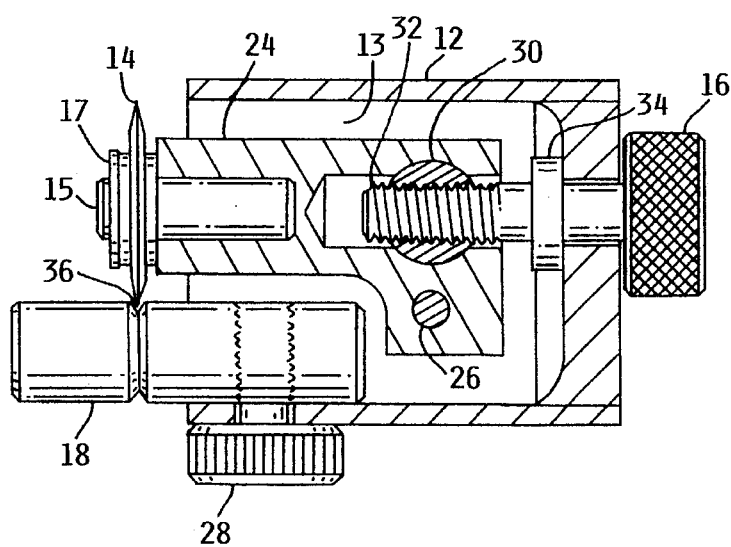
FIG. 3 shows a view taken along the lines 3—3 of FIG. 4.
Figure 4:
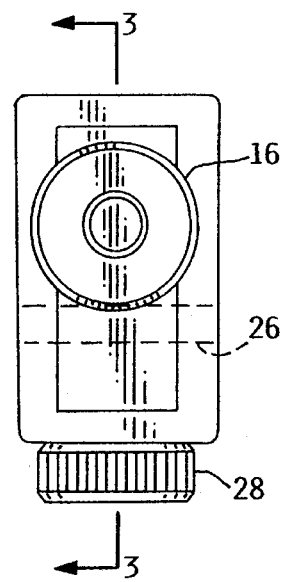
FIG. 4 shows a back view of the invention.

Referring next to FIGS. 2–4, the invention is shown in three views wherein like-numbered parts represent the same components. Cutting wheel 14 is rotatably attached via a pin 15 to the second end of a beam 24. Pin 15 is rigidly affixed within beam 24, and cutting wheel 14 is held in rotatable position on pin 15 by means of a spring C-clamp 17. Beam 24 is pivotably mounted by a means for pivoting at a first end within an interior cavity 13 of housing 12, by a pivot pin 26 which extends through housing 12 and is affixed at the outside walls of housing 12.

An adjusting knob 16 is affixed to a threaded shank 32 which is threadably attached to a yoke 30, which is loosely filled in a hole cross-drilled through beam 24. The threaded shank 32 which is affixed to adjusting knob 16 passes through a collar 34 machined on shank 32 which limits the axial movement of knob 16 and shank 32. Threaded shank 32 then passes into an enlarged opening within beam 24. Since beam 24 is pivotable about pin 26, the rotation of knob 16 will cause the threaded shank 32 to engage yoke 30 and will thereby cause beam 24 to pivot about pin 26. By rotating the knob 16 in one direction, the beam 24 pivots upwardly at the cutter wheel 14 end, and cutter wheel 14 moves away from contact against post 18. As knob 16 is rotated in the other direction, beam 24 pivots downwardly and cutter wheel 14 engages against post 18, or against a tube which may be fitted over post 18. A small groove 36 is formed into the top edge of post 18 to accept cutter wheel 14, and material of the tube which is deformed during the cutting operation.

Threaded shank 32 could be directly threaded into engagement in beam 24, thereby eliminating the need for yoke 30, if provision were made for permitting threaded shank 32 to pivot in coincidence with beam 24. For example, if a direct threaded connection is made between threaded shank 32 and beam 24, then the pivotal motion of beam 32 will be also applied to shank 32. Therefore, allowance must be made for accommodating this pivotal movement of shank 32, to permit corresponding lateral movement of retainer nut 34 and knob 16. Among other things, collar 34 would be slidably engageable along the interior surface of housing 12, and the opening through housing 12 wherein threaded shank 32 is inserted would be enlarged.

Post 18 is secured to housing 12 by means of a threaded post attachment screw 28. Post 18 may be removably attached and a plurality of different diameter posts 18 may be used in connection with the invention. This feature is particularly useful when different diameter tubing pieces are to be used in conjunction with the invention.

In operation, the adjusting knob 16 is first turned to pivot cutting wheel 14 away from contact with post 18, thereby to provide room for insertion of a suitable tube. After the tube has been inserted, the adjusting knob 16 is rotated to bring cutting wheel 14 into contact with the outer surface of the tube. The entire housing 12 may then be turned about the tube axis, as shown by the arrows 25 of FIG. 2, to cause cutting wheel 14 to cut a circumferential groove in the outer tube surface. After one or two revolutions, adjusting knob 16 may be further tightened to cause cutting wheel 14 to cut deeper into the circumferential groove of the tube. After several more revolutions, the adjusting knob is further tightened, and the process continues until cutting wheel 14 has cut entirely through the tubing, whereupon a smooth tube end will have been formed.

Figure 5:
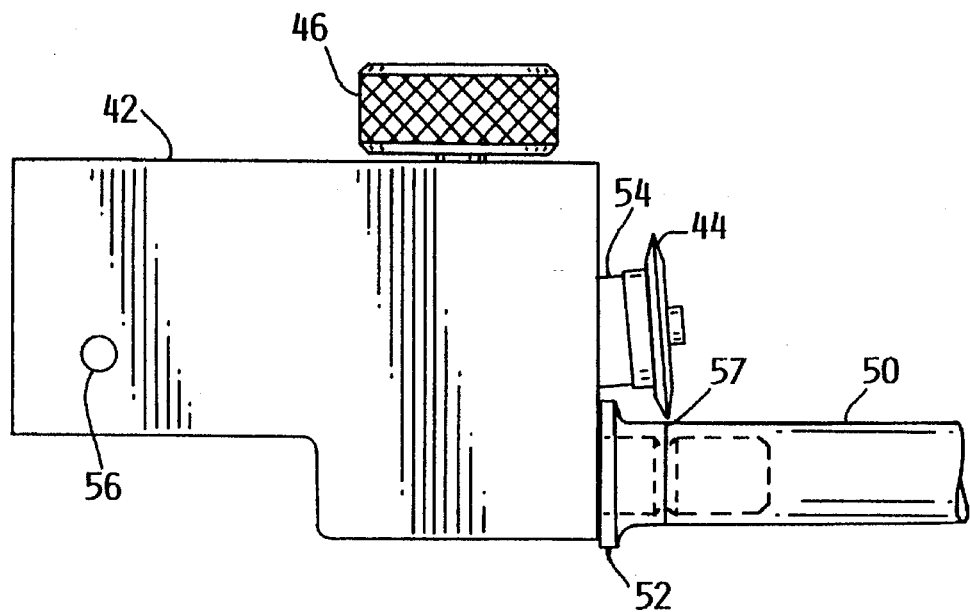
FIG. 5 shows an elevation view of an alternative embodiment.
Figure 6:
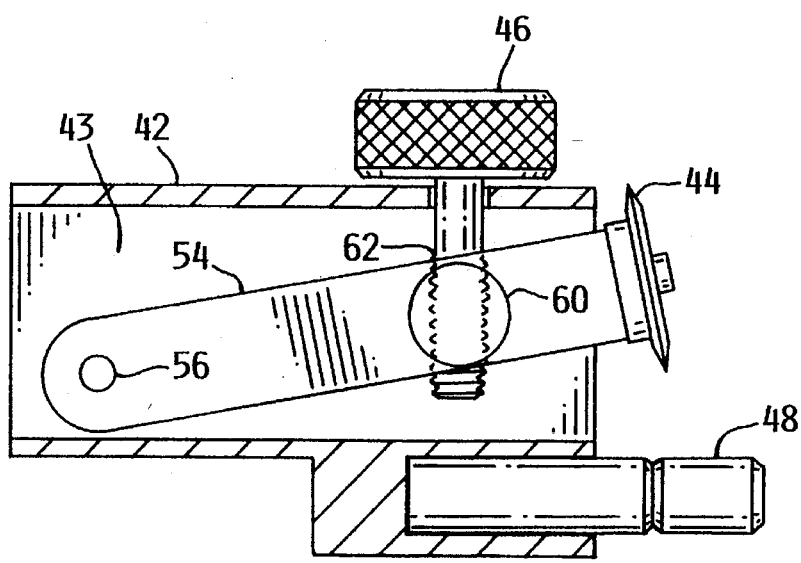
FIG. 6 shows a cross-sectional view of the device of FIG. 5.

FIG. 5 shows an alternative embodiment of the invention, and FIG. 6 shows a cross-sectional view of the embodiment of FIG. 5. In this embodiment, a housing 42 has an interior cavity 43 for the pivotal mounting of a beam 54, about a pivot pin 56. Beam 54 may be pivotally moved upwardly and downwardly by rotation of an adjusting knob 46 which has a threaded shank 62 which is threadably engageable into a yoke 60. Yoke 60 is loosely fitted into a cross-drilled hole through beam 54, and threaded shank 62 may be engaged and disengaged into yoke 60 to cause beam 54 to pivot about pin 56. A cutting wheel 44 is rotatably attached to the end of beam 54, and the path of travel of cutting wheel 44 brings it into engagement against the groove in post 48.

Yoke 60 could be eliminated from the construction of FIGS. 5 and 6, if the end of threaded shank 62 were brought into direct contact against the outer surface of beam 54, and threaded shank 62 was threadably engaged through the walls of housing 42. In this case, it is preferable to utilize a compression spring along the underside of beam 54, to urge beam 54 upwardly into contact against the end of threaded shank 62. In this arrangement, the rotation of knob 46 would cause shank 62 to thread inwardly and outwardly relative to housing 42, and the inner end of shank 62 would bear against beam 54 to force it downwardly against the spring force of the compression spring, or would permit the compression spring to force beam 54 to pivot upwardly as the threaded shank 62 was removed from contact against beam 54.

FIG. 5 shows a tubing section 50 inserted over post 48 in an operable position of the invention. As the cutting wheel 44 is engaged against the outer surface of tubing 50, adjacent the end flare 52, and the entire tool is rotatably turned about tubing 50, the cutting wheel 44 will cut a circumferential groove 57 into the outer surface of tubing 50. The operation proceeds as described with reference to the preferred embodiment, in order to sever flare 52 from tube 50 and to cause a smooth end to be formed on tube 50.

The present invention may be embodied in other specific forms without departing from the spirit or essential attributes thereof. It is, therefore, desired that the present embodiment be considered in all respects as illustrative and not restrictive, reference being made to the appended claims rather than to the foregoing description to indicate the scope of the invention.

What is claimed is:

1. A tube cutter adapted for severing a tubing end section from a length of tubing, comprising:

a) a housing having an interior cavity between a pair of spaced-apart walls and having a cylindrical post sized for insertion into said tubing end section;

b) a beam pivotally mounted in said cavity, said beam having a first end between said pair of spaced-apart walls and having a second end projecting outside said cavity;

c) a cutter wheel rotatably mounted about an axis of rotation on said second end; and d) means for pivoting said beam, so that said cutter wheel cuts through said tubing end section; said means for pivoting comprising a hole drilled at least partially through said beam, a rotatable yoke mounted in said beam along an axis normal to and passing through said hole said yoke having a threaded opening in alignment with said hole, and a threaded shank threadably engaged in said threaded opening, said threaded shank having an end projecting outside said housing, and a knob affixed to said end projecting outside.

2. The apparatus of claim 1, wherein said means for pivoting further comprises a threaded shank threadably attached to said beam and said threaded shank having an end projecting outside said housing; and a knob affixed to the end of said threaded shank projecting outside said housing.

3. The apparatus of claim 1, further comprising means for releasably fixing said cylindrical post in said housing.

4. The apparatus of claim 1, wherein said knob is adjacent said housing and has an axis of rotation which is generally normal to the axis of rotation of said cutter wheel.

5. The apparatus of claim 1, wherein said knob is adjacent said housing and has an axis of rotation which is generally parallel to the axis of rotation of said cutter wheel.

6. An apparatus for cutting a tube having an axis about a circumferential line normal to the tube axis, comprising:

a) a housing having a cylindrical post projecting therefrom, said post being sized for insertion into said tube, said housing having an internal cavity;

b) a beam having a first end in said internal cavity and pivotally mounted to said housing on a pivot pin, and having a second end projecting from said cavity and outside said housing, said pivot pin being normal to said tube axis;

c) a cutter wheel rotatably mounted to said beam second end, along an axis of rotation normal to said pivot axis; and d) means for pivoting said beam about said pivot axis so that said cutter wheel engages said tube for purposes of cutting said tube.

7. The apparatus of claim 6, wherein said means for pivoting said beam further comprises a threaded screw threadably fastened through said housing and abutting against said beam.

8. The apparatus of claim 7, wherein said screw is threadably fastened to said beam.

9. The apparatus of claim 7, wherein said screw is threadably fastened to said housing.

10. The apparatus of claim 7, further comprising a rotatable yoke in said beam and wherein said threaded screw is fastened to said yoke.

\* \* \* \* \*